(12) United States Patent
Mupparapu et al.

(10) Patent No.: US 8,393,142 B2
(45) Date of Patent: Mar. 12, 2013

(54) REDUCTANT DOSING MANIFOLD (75) Inventors: Shashank Mupparapu, Peoria, IL (US);
Raymond Upano Isada, Peoria, IL
(US); Stephan D. Roozenboom,
Washington, IL (US); **Michael R.
Errera, Milner, GA (US); Bryce L.
Tiller**, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 301 days.

(21) Appl. No.: 12/771,665

(22) Filed: Apr. 30, 2010

(65) Prior Publication Data
US 2011/0265459 A1 Nov. 3, 2011

(51) Int. Cl.
*F01N 3/10* (2006.01)
*F01N 9/00* (2006.01)

(52) U.S. Cl. ........... 60/286; 60/323; 60/303; 60/295; 417/454; 417/313; 417/559; 137/884; 137/565.01; 222/318

(58) Field of Classification Search ............ 60/286, 60/323, 303, 295; 417/454, 313, 559; 137/884, 137/565.01–565.36; 222/318
See application file for complete search history.

(56) References Cited

U.S. PATENT DOCUMENTS

| | | | |
|---|---|---|---|
| 3,889,841 A * | 6/1975 | Edmonds | 220/200 |
| 6,063,350 A | 5/2000 | Tarabulski et al. | |
| 6,273,120 B1 * | 8/2001 | Hofmann et al. | 137/98 |
| 6,394,072 B1 * | 5/2002 | Yoshida et al. | 123/506 |
| 7,100,366 B2 * | 9/2006 | Hager et al. | 60/286 |
| 7,118,613 B2 * | 10/2006 | Crawley et al. | 95/278 |
| 7,544,328 B2 | 6/2009 | Osaku et al. | |
| 2009/0038296 A1 | 2/2009 | Fukuda et al. | |
| 2009/0127265 A1 | 5/2009 | Magnusson et al. | |
| 2009/0155133 A1 | 6/2009 | Osaku et al. | |
| 2010/0047638 A1 * | 2/2010 | Johannessen | 429/17 |

FOREIGN PATENT DOCUMENTS

| | | |
|---|---|---|
| EP | 1698769 | 9/2006 |
| FR | 2915185 | 10/2008 |
| JP | 2006226282 | 8/2006 |

* cited by examiner

*Primary Examiner* — Kenneth Bomberg
*Assistant Examiner* — Brandon Lee
(74) *Attorney, Agent, or Firm* — Finnegan, Henderson, Farabow, Garrett & Dunner LLP (57) ABSTRACT

A reductant dosing manifold is disclosed. The reductant dosing manifold may have a housing with a pump interface configured to directly connect the reductant dosing manifold to a reductant pump, and a reductant supply passage in fluid communication with the pump interface. The housing may also have a reductant outlet port, and a pressurized reductant passage connecting the pump interface to the reductant outlet port.

14 Claims, 6 Drawing Sheets

REDUCTANT DOSING MANIFOLD

TECHNICAL FIELD

The present disclosure is directed to a manifold, and more particularly, to a reductant dosing manifold for use with a reductant dosing cabinet.

BACKGROUND

Internal combustion engines, including diesel engines, gasoline engines, gaseous fuel-powered engines, and other engines known in the art exhaust a complex mixture of air pollutants. These air pollutants are composed of gaseous compounds including, among other things, the oxides of nitrogen ($NO_X$). Due to increased awareness of the environment, exhaust emission standards have become more stringent, and the amount of $NO_X$ emitted to the atmosphere by an engine may be regulated depending on the type of engine, size of engine, and/or class of engine.

In order to comply with the regulation of $NO_X$, some engine manufacturers have implemented a strategy called selective catalytic reduction (SCR). SCR is an exhaust treatment process where a reductant, most commonly urea (($NH_2$)$_2CO$) or a water/urea solution, is selectively injected into the exhaust gas stream of an engine and adsorbed onto a downstream substrate. The injected urea solution decomposes into ammonia ($NH_3$), which reacts with $NO_X$ in the exhaust gas to form water ($H_2O$) and diatomic nitrogen ($N_2$).

Depending on the application, some reductant dosing systems can include many different components fluidly interconnected by way of multiple reductant supply and return lines, pressurized air lines, and electrical communication lines. For example, a reductant dosing system can include a working tank of reductant, a supply tank of reductant, a reductant pump, a reductant injector, a supply of pressurized air, heaters, control valves, pressure regulators, pressure sensors, temperature sensors, fluid level meters, etc. Each of these components can require a dedicated mounting location, fluid connection to appropriate passages of the system, and electrical connections to a dosing controller. Because every engine system can have a different configuration, custom engineering is often required to appropriately package each dosing system component and route the required reductant, air, power, and communication lines. This custom engineering can be very expensive and time consuming.

The reductant dosing manifold of the present disclosure addresses one or more of the needs set forth above and/or other problems of the prior art.

SUMMARY

In accordance with one aspect, the present disclosure is directed toward a reductant dosing manifold. The reductant dosing manifold may include a housing having a pump interface configured to connect the reductant dosing manifold to a reductant pump, and a reductant supply passage in fluid communication with the pump interface. The housing may also have a reductant outlet port, and a pressurized reductant passage connecting the pump interface to the reductant outlet port. The reductant dosing manifold may further include a control valve mounted in the housing in fluid communication with the pressurized reductant passage.

According to another aspect, the present disclosure is directed toward a reductant dosing cabinet. The reductant dosing cabinet may include a platform, a reductant pump mounted on the platform, and a reductant dosing manifold directly connected to the reductant pump and mounted on the platform. The reductant dosing cabinet may also include a frame connected to the platform, and a plurality of panels connected to the frame to at least partially enclose the reductant pump and the reductant dosing manifold.

According to yet another aspect, the present disclosure is directed toward a power system. The power system may include an engine having an exhaust passage, a generator driven by the engine to generate electricity, a battery configured to store electricity generated by the generator, and an air compressor configured to compress air. The power system may also include a reductant injector associated with the exhaust passage, a reductant tank, and a reductant dosing cabinet fluidly connected to the reductant injector, the reductant tank, and the air compressor, and electrically connected to at least one of the generator and the battery.

DETAILED DESCRIPTION

Figure 1:
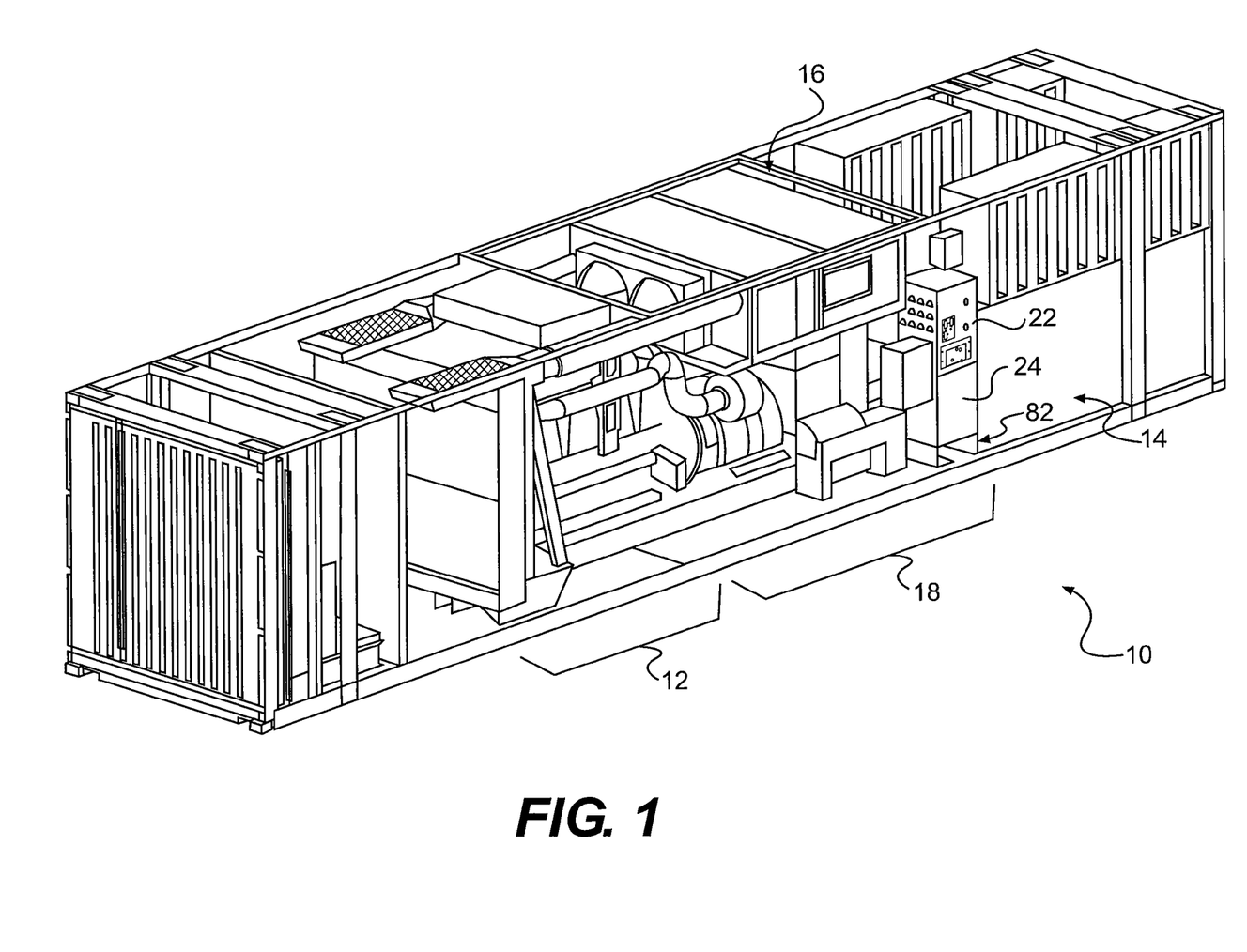
FIG. 1 is a pictorial illustration of an exemplary disclosed power system.
Figure 2:
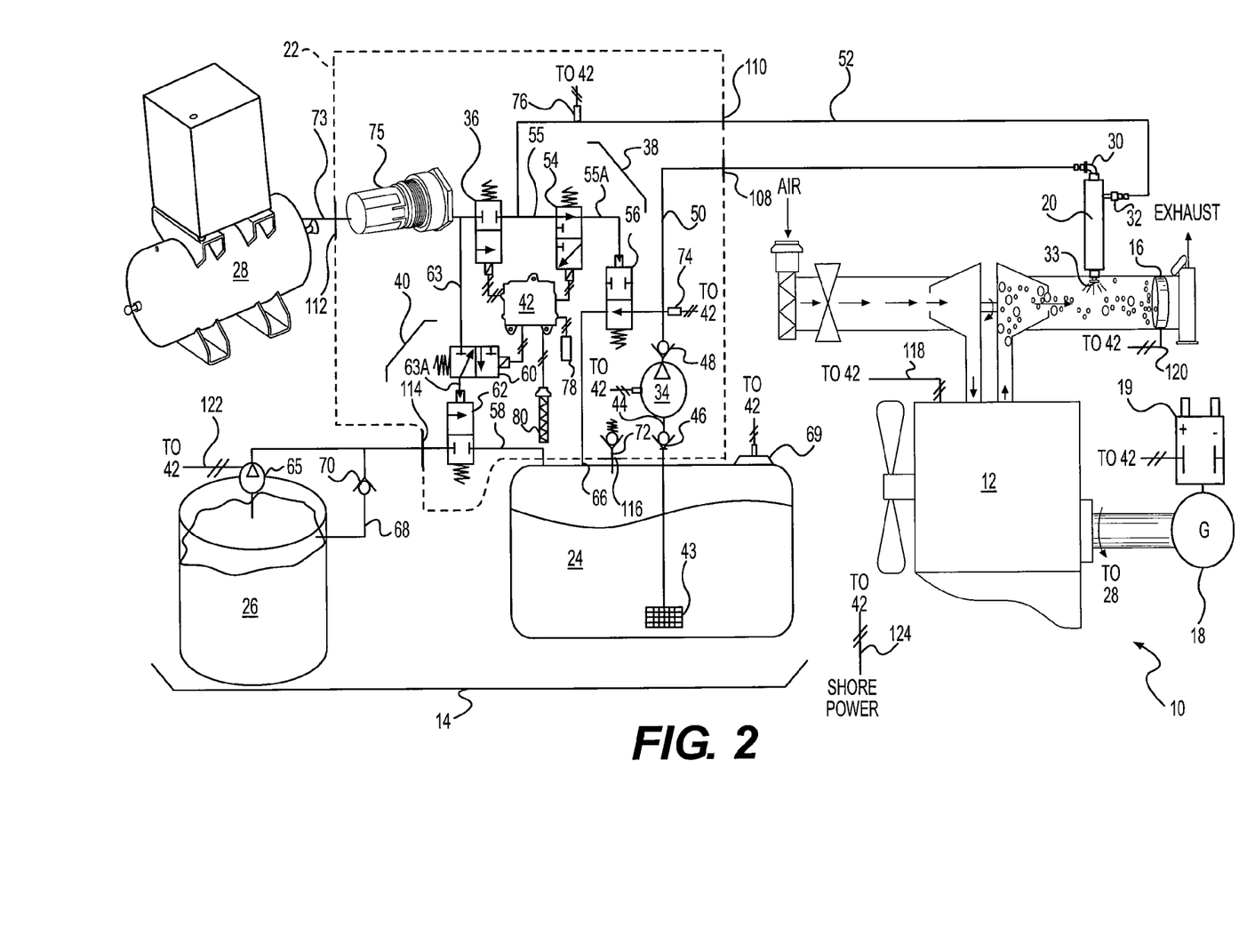
FIG. 2 is a schematic illustration of the power system of FIG. 1.

FIGS. 1 and 2 illustrate an exemplary power system 10 having an engine 12 and a reductant dosing system 14. Engine 12 may be a combustion engine operable to combust fuel and produce a mechanical power output and a flow of exhaust. The exhaust from engine 12 may be directed through an aftertreatment component 16 to the atmosphere. In one example, aftertreatment component 16 may be a reduction catalyst configured to reduce a constituent of the exhaust in the presence of a reductant to an acceptable level before discharge of the exhaust to the atmosphere. Reductant dosing system 14 may be configured to supply the reductant utilized for the reduction process occurring within aftertreatment component 16. It is contemplated that engine 12 may be associated with a generator 18 that converts the mechanical power output into an electrical output, at least a portion of which may be stored in a battery 19 (shown only in FIG. 2). In one embodiment, engine 12 and generator 18 may together form a stationary generator set. In another embodiment, engine 12 and generator 18 may together embody the prime mover of a mobile machine, for example a locomotive. In yet another embodiment, engine 12 may be used without generator 18, if desired, for example in vehicular applications, pumping applications, and marine applications.

As shown in FIG. 2, reductant dosing system 14 may be configured to spray or otherwise advance reductant into the engine's exhaust upstream of aftertreatment component 16 to affect a reducing chemical reaction. In one embodiment, reductant dosing system 14 may inject an urea solution into the exhaust of engine 12 to affect selective catalytic reduction (SCR). The urea solution may include water ($H_2O$) and urea (($NH_2$)$_2CO$). At temperatures higher than about 250° C., the urea solution may decompose into ammonia ($NH_3$) that is used to convert $NO_X$ (NO and $NO_2$) in the exhaust flow of engine 12 to diatomic nitrogen ($N_2$) and water ($H_2O$). Reductant dosing system 14 may include a reductant injector 20 associated with engine 12, a reductant dosing cabinet 22 configured to deliver reductant and pressurized air to reductant injector 20, a buffer tank 24 configured to hold a working supply of reductant for use by reductant dosing cabinet 22, a supply tank 26 configured to replenish buffer tank 24, and an air compressor 28 configured to supply pressurized air to reductant dosing cabinet 22.

Reductant injector 20 may be located upstream of aftertreatment component 16 and configured to inject reductant into the exhaust flowing through aftertreatment component 16. In one example, reductant injector 20 may include a reductant inlet port 30, a pressurized air inlet port 32, and a spray nozzle 33 located at a tip end of reductant injector 20. Pressurized air entering reductant injector 20 via inlet port 32 may mix with reductant from inlet port 30 inside of reductant injector 20 and be forced through spray nozzle 33 into the exhaust from engine 12. In some situations, such as between injection events, the pressurized air may also be used to purge reductant injector 20 by forcing residual reductant back through inlet port 30 to reductant dosing cabinet 22. It is contemplated that reductant injector 20 may alternatively function to inject reductant without the assistance of compressed air, if desired.

Reductant dosing cabinet 22 may be a generally modular assembly of components having plug-and-play functionality. That is, reductant dosing cabinet 22 may be used with many different power system configurations, be self-contained, and have a simplified connection interface that facilitates fluid, power, and data communication with other components of power system 10. As shown in FIG. 2, reduction dosing cabinet 22 may include, among other things, a reductant pump 34, an air control valve 36, a purge control valve 38, a reductant supply valve 40, and a controller 42 in communication with each of reductant pump 34, air control valve 36, purge control valve 38, and reductant supply valve 40.

Reductant pump 34 may be a metering pump such as, for example, a diaphragm pump, a centrifuge pump, piston pump, or a rotary pump. Reductant pump 34 may be electrically operated to draw low-pressure reductant through a filter 43 located within buffer tank 24, and to pressurize the reductant to a desired level. Reductant pump 34 may be connected to filter 43 by way of a passage 44, and a check valve 46 may be located within passage 44 to help ensure a unidirectional flow of reductant through passage 44. Filter 43 may embody a metal screen configured to remove ice crystals, urea crystals, and/or other debris from the reductant before it is received by reductant pump 34. Reductant pressurized by pump 34 may be directed past another check valve 48 and through a passage 50 to inlet port 30 of reductant injector 20. It is contemplated that reductant pump 34 may be connected to draw reductant directly from supply 26, if desired.

Air control valve 36 may be selectively energized to control the flow of pressurized air to reductant injector 20. Air control valve 36 may include a solenoid-actuated and spring-biased valve element that is movable between an open or flow-passing position and a closed or flow-blocking position based on a signal from controller 42. When air control valve 36 is in the open position, pressurized air may pass through air control valve 36 and a passage 52 to reductant injector 20 for injection and purging purposes. When air control valve 36 is in the closed position (shown in FIG. 2), the flow of pressurized air through air control valve 36 may be inhibited. Air control valve 36, in the depicted embodiment, may be spring-biased toward the closed position. It is contemplated that reductant injector 20 may function to inject reductant without the assistance of compressed air, if desired.

Purge control valve 38 may include multiple valve elements that cooperate to control whether the pressurized air passing through air control valve 36 and passage 52 is used for injection purposes or for purging purposes. In particular, purge control valve 38 may include a first valve element 54 that is solenoid-actuated and spring-biased to move between a first position and a second position based on a signal from controller 42, and a second valve element 56 that is pilot operated by air passing through first valve element 54. When first valve element 54 is in the first position (shown in FIG. 2), pressurized air passing through air control valve 36 may also pass through a branch passage 55 and first valve element 54 to push second valve element 56 toward a closed position. The use of pressurized air to move second valve element 56 may increase an available moving force over another type of valve, for example a solenoid-operated valve. When first valve element 54 is in the second position, pressurized air in a portion 55A of branch passage 55 acting on second valve element 56 may be relieved to the atmosphere, thereby allowing second valve element 56 to be spring-biased toward an open position. When second valve element 56 is in the closed position and reductant pump 34 is operated to pressurize reductant, both pressurized air and reductant may be directed to injector 20 to initiate an injection event. When second valve element 56 is in the open position, pressurized air directed through passage 52 and into reductant injector 20 via inlet port 32, may flow back out of reductant injector 20 and inlet port 30 to passage 50, through second valve element 56 and to a return passage 66 to purge reductant injector 20 and passage 50 of residual reductant. This pressurized air may then continue in reverse direction through passage 50 to a tank passage 58 that communicates with buffer tank 24.

Reductant supply valve 40 may be used to selectively replenish buffer tank 24 with reductant from supply tank 26. Similar to purge control valve 38, reductant supply valve 40 may also include a first valve element 60 that is solenoid-operated and spring-biased, and a second valve element 62 that is pilot operated by air passing through first valve element 60. First valve element 60 may be movable between a first position and a second position based on a signal from controller 42. When in the first position, first valve element 60 may allow pressurized air from compressor 28 to flow through a branch passage 63 and first valve element 60 to push second valve element 62 toward an open position. When in the second position (shown in FIG. 2), first valve element 62 may relieve to the atmosphere the air pressure in a portion 63A of branch passage 63 acting on second valve element 62, thereby allowing second valve element 62 to be spring-biased toward the closed position. When second valve element 62 is open, reductant that has been pressurized by a supply tank pump 65 or gravity may be allowed to flow from supply tank 26 through tank passage 58 and into buffer tank 24. When second valve element 62 is closed, reductant may be blocked from flowing through passage 58 to buffer tank 24. In one example, the activation of first valve element 60, and subsequently the movement of second valve element 62, may be triggered by controller 42 in response to a signal from a fluid level sensor 69 associated with buffer tank 24.

Supply tank 26 may be fluidly connected to buffer tank 24 by way of passage 58 to facilitate reductant replenishment of buffer tank 24. In most applications, supply tank 26 may have a larger capacity than buffer tank 24, and even be simultaneously connected to multiple buffer tanks of different dosing systems. In one embodiment, supply tank pump 65 may be selectively energized based on a signal from controller 42 to pump reductant from supply tank 26 to buffer tank 24. Supply tank pump 65 may be operable in response to a fluid level within buffer tank 24 or, alternatively, continuously operable regardless of a fluid level within buffer tank 24. It is contemplated that the flow of reductant from supply tank 26 to buffer tank 24 may be facilitated by gravity, if desired. That is, supply tank 26 may be located gravitationally higher than buffer tank 24 such that gravity causes or enhances the reductant flow to buffer tank 24. In some situations, a bypass line 68 having a valve, for example a check valve 70, disposed therein may be connected between tank passage 58 and supply tank 26 so that reductant pressurized by supply tank pump 65 may return to supply tank 26 when buffer tank 24 does not require replenishing. To help reduce pressure buildup within buffer tank 24 caused by returning reductant/purge air, a vent 72 may be associated with buffer tank 24. Vent 72 may selectively open to relieve the pressure within buffer tank 24 based on a pressure within buffer tank 24.

Air compressor 28 may be connected to air control valve 36 by way of a supply passage 73. In one embodiment, air compressor 28 may be a stand-alone component that is either mechanically or electrically driven by engine 12. In another embodiment, air compressor 28 may be a part of an existing air induction system that also supplies compressed air to engine 12, for example a compressor portion of an engine turbocharger. In either configuration, a pressure regulator 75 may be disposed within supply passage 73, between air compressor 28 and air control valve 36, to mechanically regulate a pressure of air passing to control valve 36 for injection by and purging of reductant injector 20.

One or more sensors may be associated with reductant dosing system 14 and included within reductant dosing cabinet 22 to provide indications as to the operation of reductant dosing system 14. For example, a first pressure sensor 74 may be associated with passage 50 and configured to provide a signal indicative of a pressure of reductant supplied to reductant injector 20. A second pressure sensor 76 may be associated with passage 52 and configured to provide a signal indicative of a pressure of air supplied to reductant injector 20. A temperature sensor 78 may be located in the general vicinity of tank passage 58 and configured to provide a signal indicative of a temperature of reductant dosing system 14. It is contemplated that additional and/or different sensors may be associated with reductant dosing cabinet 22, if desired.

Controller 42 may be in communication with the control valves, pumps, and sensors of reductant dosing system 14, to regulate operation of the control valves and pumps in response to input from the sensors and/or input received from engine 12 and aftertreatment component 16. Controller 42 may embody a single or multiple microprocessors, field programmable gate arrays (FPGAs), digital signal processors (DSPs), etc. that include a means for controlling an operation of reductant dosing system 14 in response to the signals received from sensors 69, 74, 76, 78, from engine 12, and/or from aftertreatment component 16. Numerous commercially available microprocessors can be configured to perform the functions of controller 42. It should be appreciated that controller 42 could readily embody a microprocessor separate from that controlling other non-exhaust related power system functions, or that controller 42 could be integral with a general power system microprocessor and be capable of controlling numerous power system functions and modes of operation. If separate from the general power system microprocessor, controller 42 may communicate with the general power system microprocessor via datalinks or other methods. Various other known circuits may be associated with controller 42, including power supply circuitry, signal-conditioning circuitry, actuator driver circuitry (i.e., circuitry powering solenoids, motors, or piezo actuators), and communication circuitry.

In one configuration, one or more heaters may be associated with reductant dosing cabinet 22 and regulated by controller 42. For example, a first heater 80 may be located in the general vicinity of tank passage 58 and be energized to selectively to raise a temperature of reductant passing through reductant dosing system 14 to prevent freezing of the reductant. Other heaters (not shown) may similarly be associated with reductant pump 34 and/or buffer tank 24, if desired.

Figure 3:
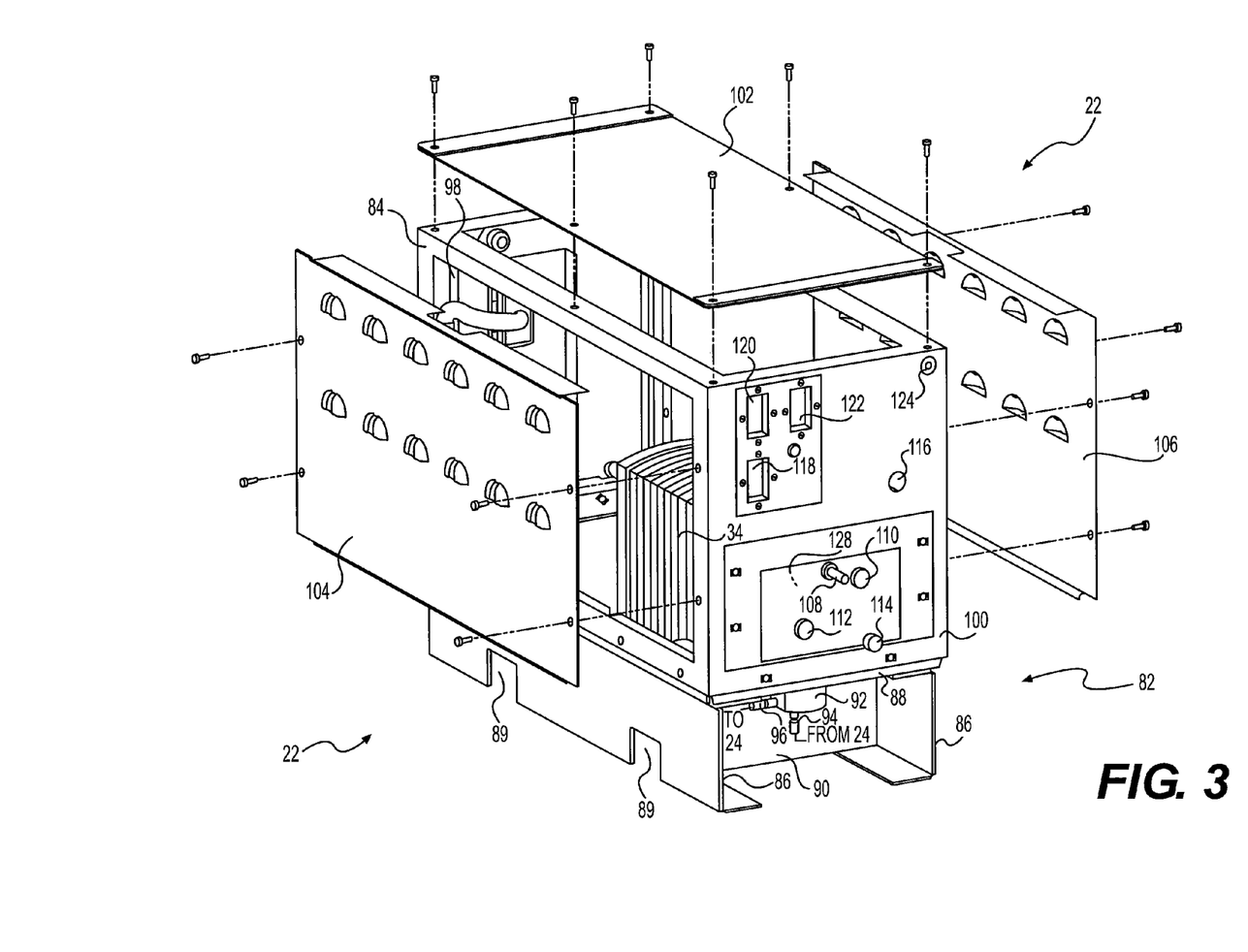
FIG. 3 is an exploded-view illustration of an exemplary disclosed reductant dosing cabinet that may be used with the power system of FIG. 1.

As shown in FIG. 3, reductant dosing cabinet 22 may include a housing that at least partially encloses and supports control and delivery components of reductant dosing system 14 that may be common between different power system configurations. For example, reductant dosing cabinet 22 may include a mounting platform 82, a frame 84 connected to mounting platform 82, and a plurality of panels connected to frame 84.

Mounting platform 82 may include side rails 86 extending in a length direction of reductant dosing cabinet 22, and a base member 88 connected to each of side rails 86. Base member 88 may be connected to top surfaces of side rails 86 such that a generally open cavity may be formed between side rails 86. Side rails 86 may include hoist openings 89 that facilitate positioning of reductant dosing cabinet 22, and one or more cross braces 90 that provide strength to mounting platform 82. In one embodiment, buffer tank 24 (referring to FIGS. 1 and 2) may be mounted within the open cavity between side rails 86. In another embodiment, side rails 86 may be mounted on top of buffer tank 24 or buffer tank 24 may be mounted vertically between mounting platform 82 and side rails 86, if desired. In any configuration, a tank adapter 92 may protrude through base member 88 and include supply and return ports 94, 96 that allow components inside of reductant dosing cabinet 22 to directly or remotely fluidly communicate with buffer tank 24.

Frame 84 may be connected to an upper portion of base member 88 and provide mounting for the panels of reductant dosing cabinet 22. For example, a rear panel 98, a front panel 100, a top panel 102, a left-side panel 104, and a right-side panel 106 may be connected to frame 84. In one embodiment, rear and front panels 98, 100 maybe fixedly connected to frame 84, while top, left- and right-side panels 102, 104, 106 may be removably attached to frame 84 to provide for three-sided maintenance access to the components contained within reductant dosing cabinet 22. One or more panels of reductant dosing cabinet 22, for example left- and right-side panels 104, 106, may be ventilated, if desired, to provide for convection cooling and/or heating of reductant dosing cabinet 22.

Front panel 100 may serve as the sole connection panel that facilitates fluid, power, and communication connections to other components of power system 10. In the depicted embodiment of front panel 100, five different fluid ports and four different electrical connections are provided, although any number and type of ports and connections may be included. The depicted fluid ports may include an injector supply port 108 associated with passage 50, an air supply port 110 associated with passage 52, an air inlet port 112 associated with passage 73, a reductant refill port 114 associated with tank passage 58, and a vent port 116 associated with vent 72. The depicted electrical connections may include a first connection 118 configured to receive power and facilitate communications with engine 12, a second connection 120 configured to provide power to and facilitate communications with aftertreatment component 16 (i.e., to provide power to and communications with temperature, pressure, and/or NOx sensors associated with aftertreatment component 16), a third connection 122 configured to provide power to and facilitate communications with supply tank pump 65, and a fourth connection 124 configured to receive shore power.

Figure 4:
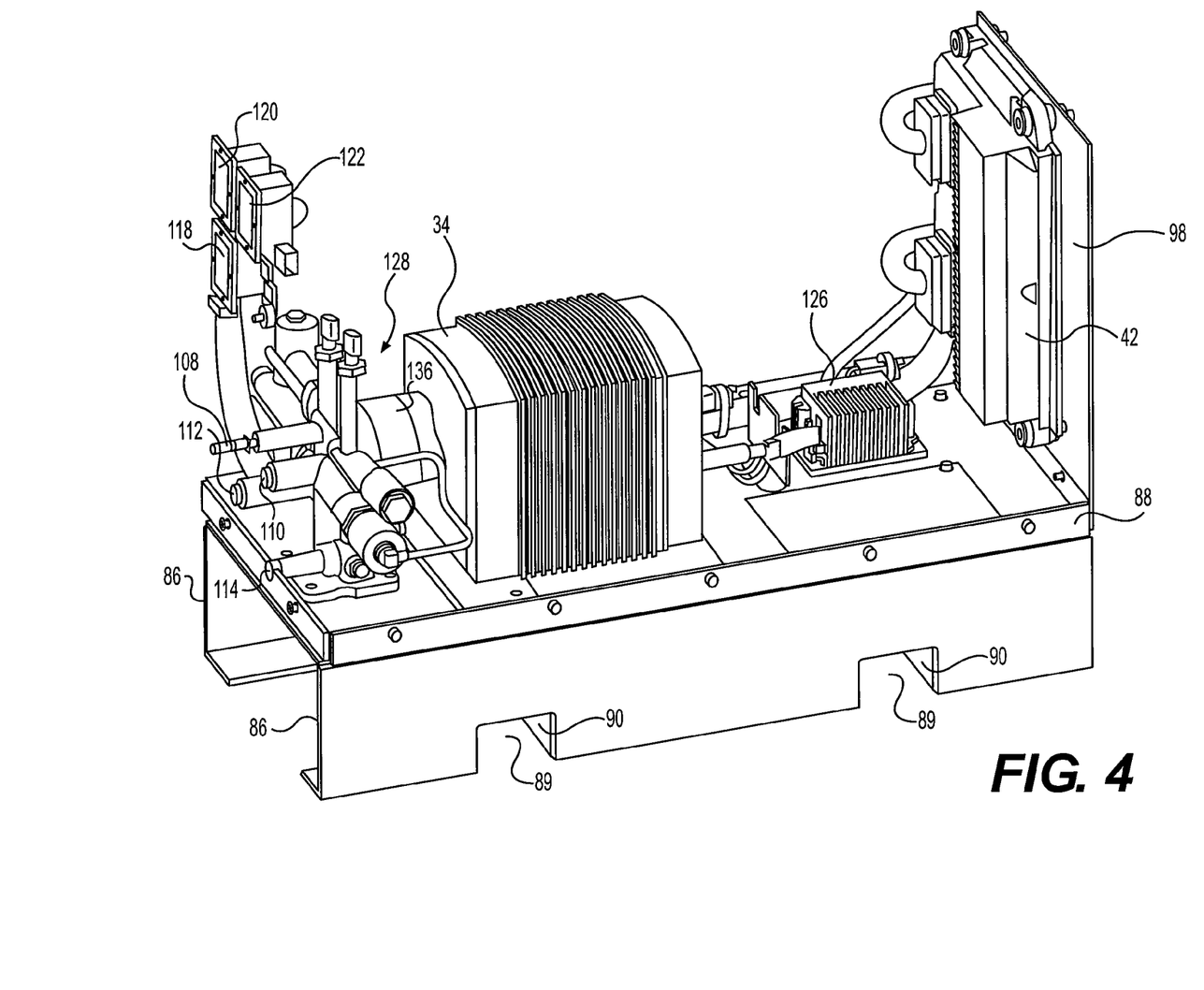
FIG. 4 is a pictorial illustration of a portion of the reductant dosing cabinet of FIG. 3.

As shown in FIG. 4, controller 42 may be mounted to rear panel 98, while reductant pump 34 may be mounted to base member 88. Power electronics 126, for example a converter, may be mounted to base member 88 and electrically connected to controller 42. A manifold 128 may also be mounted to base member 88 and directly connected to reductant pump 34, manifold 128 forming a housing and/or mount for the ports, passages, and sensors of reductant dosing cabinet 22.

Figure 5:
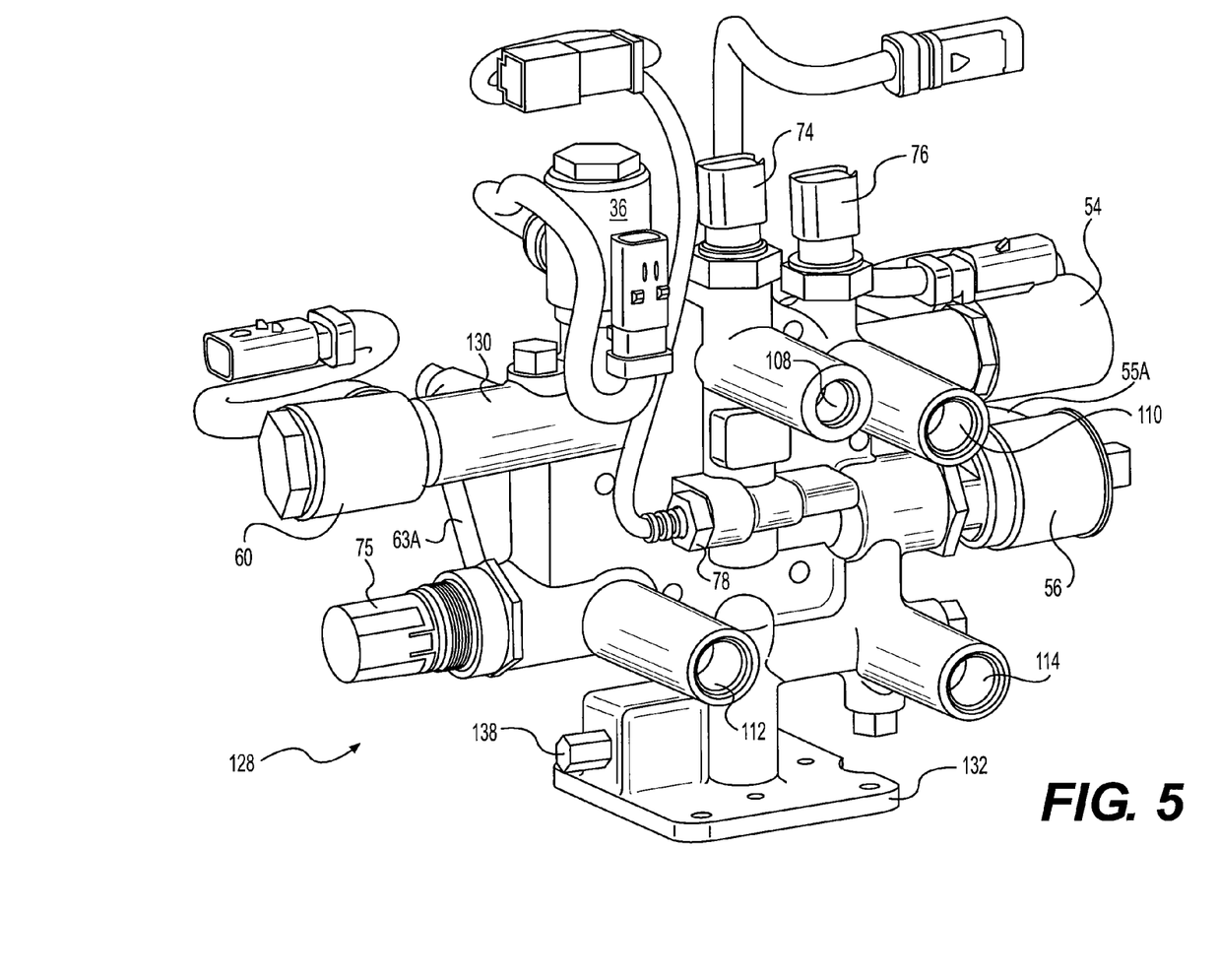
FIGS. 5 and 6 are front and back pictorial illustrations of an exemplary disclosed reductant dosing manifold that may be used within the reductant dosing cabinet of FIG. 3.
Figure 6:
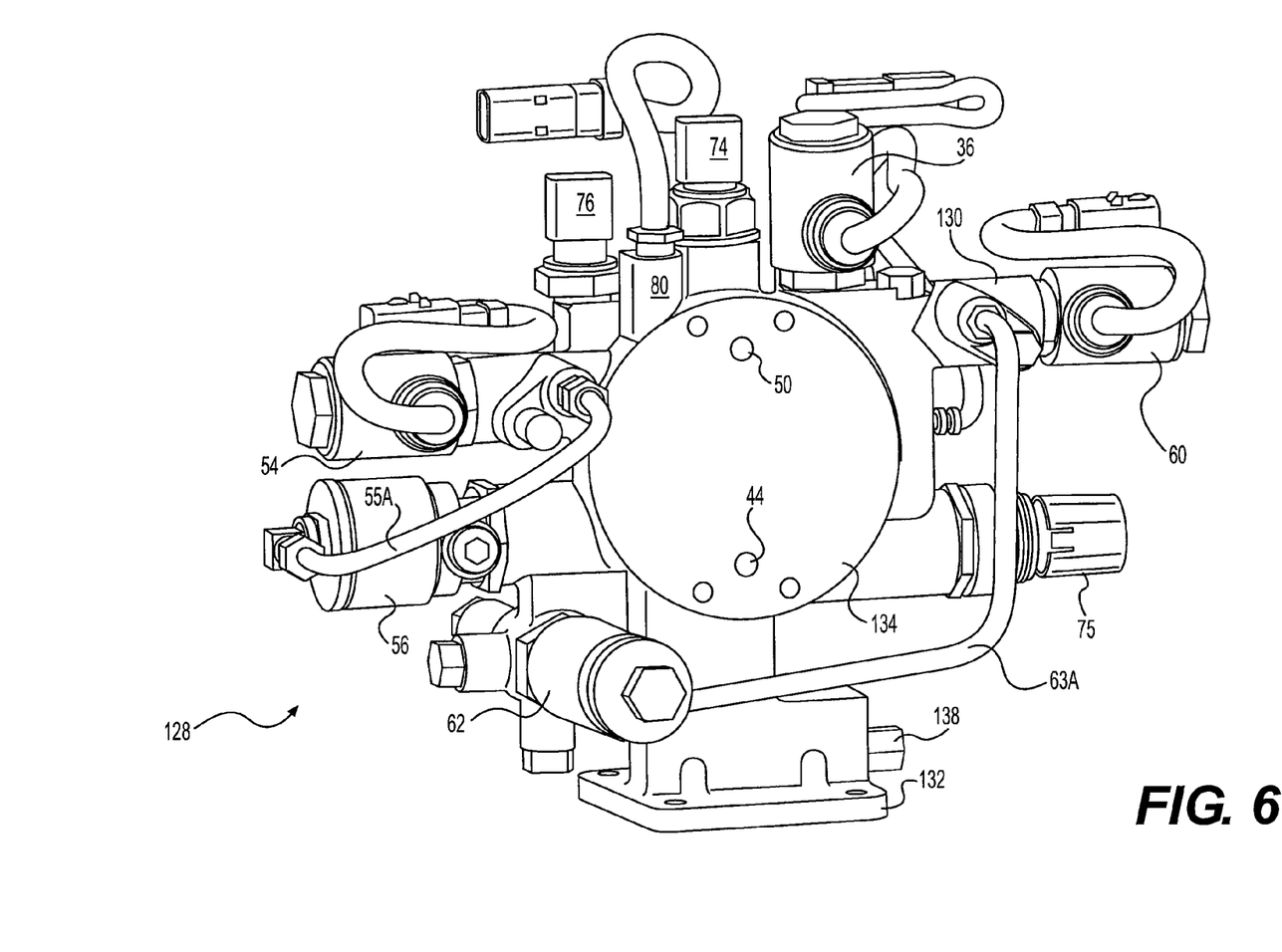

As shown in FIGS. 5 and 6, manifold 128 may embody an assembly of components, including control valves 36, 38, and 40; pressure regulator 75; pressure sensors 74, and 76; temperature sensor 78; heater 80; and a housing 130 in which control valves 36, 38, and 40; pressure regulator 75; pressure sensors 74, and 76; temperature sensor 78; and heater 80 may be mounted. Housing 130 may embody a single integral casting fabricated from a non-corrosive material, for example stainless steel, having ports 108, 110, 112, and 114; and bores to receive control valves 36, 38, and 40; pressure regulator 75; pressure sensors 74, and 76; temperature sensor 78; and heater 80. Alternatively, it is contemplated that housing 130 could be embody two separate castings, including a first casting fabricated from steel and configured to house air-related components, and a second casting fabricated from stainless steel and configured to house reductant-related components, if desired. The two-casting configuration may result in a lower cost assembly.

Portions of passages 44, 50, 52, 55, 58, 63, and 73 may be formed within housing 130 to connect the different ports and components of manifold 128. For example, passage 44, from tank adapter 92 (referring to FIG. 3) to reductant pump 34, may be formed within housing 130. In addition, passage 50, from reductant pump 34 to injector supply port 108, may be formed within housing 130. Passage 52, from air supply port 110 to passage 73, may be formed within housing 130. The portion of branch passage 55, from passage 52 to first valve element 54 of purge control valve 38, may be formed within housing 130, while the portion 55A of branch passage 55 may be formed by an external tube connected at one end to housing 130 and at another end to second valve element 56. Tank passage 58, from reductant refill port 114 to return passage 66 and purge control valve 38, may be formed within housing 130. The portion of branch passage 63, from passage 73 to first valve element 60 of reductant control valve 40, may be formed within housing 130, while the portion 63A of branch passage 63 may be formed by an external tube connected at one end to housing 130 and at another end to second valve element 62. Finally, passage 73, from air inlet port 112 to passage 52, may be formed within housing 130. It is contemplated that additional and/or different passages may be formed within housing 130, if desired.

Housing 130 may further include a mounting base 132 configured to mount manifold 128 to base member 88, and a pump interface 134 that facilitates direct connection between manifold 128 and reductant pump 34 or between manifold 128 and a head adapter 136 (FIG. 3) of reductant pump 34. Passages 44 and 66 may pass through mounting base 132 and terminate at tank adapter 92 (referring to FIG. 2), while passages 44 and 50 may pass through pump interface 134 and terminate at head adapter 136. Passages 44 and 66, in the mounting base, may fluidly communicate with supply and return ports 94, 96 via tank adapter 92, respectively.

A freeze plug 138 may be associated with housing 130 to reduce the risk of cracking during extreme cold temperatures. Freeze plug 138 may embody, for example, a plug member having a spring-biased expansion chamber and being disposed within a bore of housing 130. As liquid within housing 130 freezes, the freezing and expanding liquid may push past the spring of freeze plug 138 and expand into the associated chamber. This expansion may help to reduce forces caused by the expanding liquid on housing 130, thereby reducing the risk of cracking housing 130.

Industrial Applicability

The disclosed reductant dosing manifold and cabinet may be used in any power system application where plug-and-play functionality are desired. That is, the disclosed reductant dosing manifold and cabinet may provide modularity such that the same manifold and cabinet configurations may be utilized with varying power system arrangements without requiring significant custom engineering.

It will be apparent to those skilled in the art that various modifications and variations can be made to the disclosed reductant dosing manifold and cabinet. Other embodiments will be apparent to those skilled in the art from consideration of the specification and practice of the disclosed reductant dosing manifold and cabinet. It is intended that the specification and examples be considered as exemplary only, with a true scope being indicated by the following claims and their equivalents.

What is claimed is:

1. A power system, comprising:
    an engine having an exhaust passage;
    a generator driven by the engine to generate electricity;
    a battery configured to store electricity generated by the generator;
    an air compressor powered by the engine to compress air;
    a reductant injector associated with the exhaust passage;
    a reductant supply tank; and
    a reductant dosing cabinet mounted on a platform, the reductant dosing cabinet including:
        a reductant pump mounted on the platform;
        a reductant dosing manifold connected to the reductant pump and mounted on the platform, wherein the reductant dosing manifold includes:
            an air inlet port connected to the air compressor;
            an air outlet port connected to the reductant injector;
            a reductant inlet port connected to the reductant tank; and
            a reductant outlet port connected to the reductant injector, wherein
            each of the air inlet and outlet ports and the reductant inlet and outlet ports is disposed on a same side of the platform.

2. The power system of claim 1, further including:
    a frame connected to the platform; and
    a plurality of panels connected to the frame to at least partially enclose the reductant pump and the reductant dosing manifold.

3. The power system of claim 2, wherein the plurality of panels includes a connection panel attached to the frame, and each of the air inlet and outlet ports and the reductant inlet and outlet ports extends through the connection panel on a front side of the platform.

4. The power system of claim 3, wherein the plurality of panels includes ventilated side panels attached to the frame.

5. The power system of claim 4, wherein:
    the plurality of panels includes a rear panel attached to the frame; and the reductant dosing cabinet further includes an electronic control module attached to the rear panel and in communication with the reductant pump and the reductant dosing manifold.

6. The power system of claim 1, wherein:
the engine further includes an aftertreatment component located within the exhaust passage downstream of the reductant injector; and
the reductant dosing cabinet is electrically connected to the aftertreatment component.

7. The power system of claim 1, further including a reductant buffer tank in fluid communication with the reductant supply tank.

8. The power system of claim 1, wherein the reductant dosing manifold further includes a control valve mounted in fluid communication with a pressurized reductant passage.

9. The power system of claim 8, wherein the reductant dosing manifold further includes:
a first pressure sensor in fluid communication with the pressurized reductant passage; and
a second pressure sensor in fluid communication with the air outlet port.

10. The power system of claim 8, wherein the reductant dosing manifold further includes a reductant return passage in fluid communication with the control valve.

11. The power system of claim 10, wherein the reductant return passage is located within the platform.

12. The power system of claim 1, wherein the reductant dosing manifold further includes a pressure regulator between the air inlet and outlet ports.

13. The power system of claim 12, wherein the reductant dosing manifold further includes a first valve element and a second valve element, the second valve element configured to selectively allow pressurized air passing through the pressure regulator to move the first valve element.

14. The power system of claim 1, further including a reductant tank adapter configured to be connected to a reductant buffer tank, the adapter extending through the platform.

* * * * *

UNITED STATES PATENT AND TRADEMARK OFFICE
CERTIFICATE OF CORRECTION

| | | |
|---|---|---|
| PATENT NO. | : 8,393,142 B2 | Page 1 of 1 |
| APPLICATION NO. | : 12/771665 | |
| DATED | : March 12, 2013 | |
| INVENTOR(S) | : Mupparapu et al. | |

It is certified that error appears in the above-identified patent and that said Letters Patent is hereby corrected as shown below:

In the Specification

Column 8, line 11, delete "Industrial Applicability" and insert -- INDUSTRIAL APPLICABILITY --.

Signed and Sealed this
First Day of September, 2015

Michelle K. Lee
*Director of the United States Patent and Trademark Office*